UNITED STATES PATENT OFFICE.

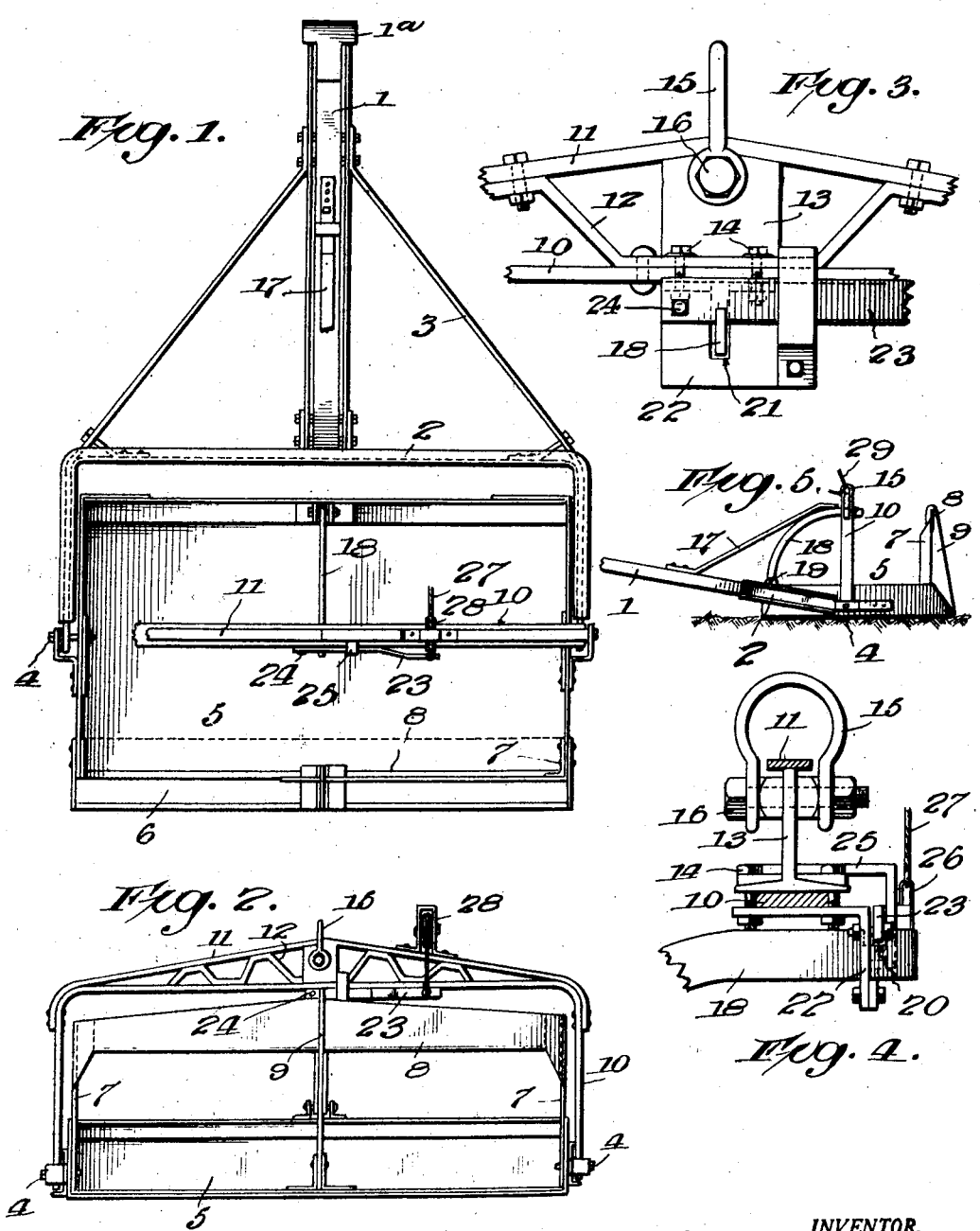

CYRUS HARLAN WOLFE, OF CHARLOTTE, NORTH CAROLINA, ASSIGNOR OF ONE-FOURTH TO L. R. HEINTZ AND ONE-FOURTH TO CARL M. HEINTZ, BOTH OF CABARRUS COUNTY, NORTH CAROLINA.

SHOVEL.

1,405,653.   Specification of Letters Patent.   Patented Feb. 7, 1922.

Original application filed January 23, 1920, Serial No. 353,560. Divided and this application filed June 8, 1920. Serial No. 387,365.

*To all whom it may concern:*

Be it known that I, CYRUS HARLAN WOLFE, a citizen of the United States, residing at Charlotte, in the county of Mecklenburg and State of North Carolina, have invented certain new and useful Improvements in Shovels, of which the following is a specification.

This invention relates to the construction of shovels for use in connection with power operated shoveling or excavating machines, such for example as illustrated in my prior Patents No. 798,246, dated August 29th, 1905 and No. 898,618, dated September 15th, 1908, and in my copending application Serial No. 353,560, filed January 23rd, 1920, of which application this is a division.

While designed especially for use in connection with machines of the above type, the present invention is by no means limited to such use, but, in its broader aspects embodies features which may be successfully employed with almost any power shovel or excavator.

One object of the invention is to provide simple and effective means whereby the shovel may be readily manipulated so as to properly fill itself with the material to be handled.

Another object is to provide an improved construction of shovel whereby the same is rendered more rigid, and the free and cutting edge prevented from sagging or buckling.

With the above and other objects in view and to improve generally upon the structural details of such a device, my invention consists in the construction and arrangement of parts hereinafter described and claimed and illustrated in the accompanying drawings, in which—

Fig. 1 is a plan view of the shovel and boom, parts being broken away.

Fig. 2 is a front elevation of the shovel and associated parts.

Fig. 3 is a fragmentary, enlarged, front elevation of a portion of the supporting bail and shovel locking device.

Fig. 4 is a transverse vertical section through such bail, showing the locking mechanism in side elevation, and Fig. 5 is a side elevation of the complete shovel and boom on a reduced scale.

Referring to the drawings in detail, the shovel is supported by a rigid boom 1, provided at one end with a journal member 1ª, by means of which it is pivoted to the frame of an engine or other suitable operating machine, as in my above mentioned application. This boom is rigidly secured at its other end to a U-shaped yoke 2. Braces 3 preferably extend from the yoke to the boom to lend rigidity to the structure. The free ends of the yoke are pivoted at 4 to the sides of a shovel designated in its entirety by the reference number 5. The pivots 4 are so located that the shovel, while nearly balanced, has a tendency to tip downwardly to discharging position, and will in fact swing by gravity to such position unless restrained.

The shovel as shown has a flat bottom provided with a free edge, and to such edge is preferably secured a reinforcing plate 6.

In order to prevent the bottom of the shovel from sagging, and to render the same more rigid, I have devised the novel construction forming an important part of the present invention. This consists of a beam or truss 8 supported at its ends by posts 7 secured to the sides of the shovel and a bar 9 secured at its upper end to the beam 8 and at its lower end to the free edge of the shovel bottom (see Fig. 2). This bar 9 is relatively thin and flat and disposed longitudinally of the shovel so as not to interfere with the passage of material into or out of the same. By virtue of this arrangement it will be seen that the bottom of the shovel is thus supported at its middle point and prevented from sagging or buckling.

In order to raise and lower the shovel I provide a supporting bail designated in its entirety by the reference numeral 10 and attached at its free ends to the pivots 4. The middle portion of this bail is preferably of trussed construction and comprises a reinforcing member 11 spaced from the main member and braced by means of bridge-work 12, all as clearly shown in Figs. 2 and 3. At the center of the bail is located a plate 13 secured by bolts 14 to the bail member 10 and attached to this plate by means of a pivot pin 16 is a clevis 15.

A brace arm 17 is adjustably secured to the boom 1 and projects forwardly so that its free end is in position to engage the plate 13 in certain positions of the shovel, as for example in Fig. 5, and limit the angular movement of the bail 10 relative to the boom.

When in operation the shovel is locked rigidly to the bail 10 by means of a curved arm 18 secured to the rear edge of the shovel at 19 and extending through a guide opening 21 in a bracket 22 also supported by the bolts 14 (see Fig. 4). In the upper edge of the free end of the arm 18 is formed a notch 20 (Fig. 4), and adapted to engage this notch is a latch 23 pivoted at 24 to the bracket 22 and having a keeper 25 to hold it in position. The free end of this latch preferably carries a clevis 26 to which is attached a line 27 passing over a suitable pulley 28 mounted on the bail and extending back to the operator's position on the engine platform.

Referring again to Fig. 4 it will be particularly noted that the notch 20 is wider than the thickness of the latch 23. The result of this is that a slight play or angular displacement of the shovel with respect to the bail 10 is permitted, even when the latch is in locking position in the notch 20.

For raising and lowering the shovel, I provide a cable 29 attached to the clevis 15 and extending to suitable hoisting mechanism.

Fig. 5 shows the parts in the position which they occupy when the shovel is being filled. During this filling operation, the shovel is forced to the right, as viewed in Fig. 5, and the brace 17 prevents the free end of the shovel from tilting up. If, owing to the nature of the ground or material, the shovel should fail to fill properly, a very slight tension is applied to the cable 29, and this tends to tip the nose of the shovel downwardly and thus cause it to bite into the material. This slight tipping action is possible by virtue of the play or lost motion due to the fact that the notch 20 (Fig. 4) is wider than the latch 23.

When the shovel has been properly filled with material, it is hoisted by means of the cable 29. When in the proper position, the shovel may then be dumped by a pull on the line 27, which releases the latch 23 and permits the shovel to tip forwardly by gravity on its pivots 4 into dumping position, the arm 18 sliding through the guide opening 21.

It is, therefore, seen that I have produced an improved shovel of simple, rigid and efficient design, and it is thought that the many advantages of my invention will be fully appreciated without further discussion.

What I claim is:

1. In a shoveling device, the combination with a supporting bail, of a shovel pivotally mounted therein so as to be capable of tipping forwardly, means for preventing the shovel from tipping rearwardly, an arm secured to the rear of the shovel, and means for locking the arm to the bail to prevent forward turning of the shovel on its pivots.

2. In a shoveling device, the combination with a supporting bail, of a shovel pivotally mounted therein, said bail having a guide opening, an arm secured to the shovel and extending through said opening, and a latch carried by the bail and adapted to engage a notch in the arm and lock the same.

3. In a shoveling device, the combination with a shovel, of a bail pivoted thereto, an arm secured to the shovel, and extending adjacent the bail and a latch carried by the bail, said arm having a notch in which the latch engages, said notch being wider than the latch, whereby slight angular movement of the shovel is permitted even when locked.

4. In a shoveling device, an open shovel having a bottom and sides, and means intermediate the sides and disposed wholly at the front of the shovel for supporting the bottom of the shovel adjacent its free edge.

5. In a shoveling device, an open shovel having a bottom and sides, a beam extending across the shovel, parallel with the bottom, at a point above the sides, and a supporting bar secured to said beam, and to the bottom, adjacent its free edge only, leaving the interior of the shovel free and unobstructed.

6. In a shoveling device, an open shovel having a bottom and sides, a beam extending across the shovel, parallel with the bottom, at a point above the sides, and a supporting bar secured to said beam, and to the bottom, adjacent its free edge, said bar being relatively thin, flat and narrow, whereby it can readily enter the material being excavated, and whereby the interior of the shovel is left clear and unobstructed.

In testimony whereof I affix my signature.

CYRUS HARLAN WOLFE.